(12) United States Patent
Jenson et al.

(10) Patent No.: US 11,373,104 B2
(45) Date of Patent: Jun. 28, 2022

(54) CONNECTING OBP OBJECTS WITH KNOWLEDGE MODELS THROUGH CONTEXT DATA LAYER

(71) Applicant: BAE SYSTEMS Information and Electronic Systems Integration Inc., Nashua, NH (US)

(72) Inventors: Nicholas R. Jenson, Poway, CA (US); Kari Perry, Reston, VA (US); Nicholas M. Swenson, Escondido, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 585 days.

(21) Appl. No.: 16/523,160

(22) Filed: Jul. 26, 2019

(65) Prior Publication Data

US 2021/0027176 A1    Jan. 28, 2021

(51) Int. Cl.
*G06N 5/02* (2006.01)
*G06Q 10/06* (2012.01)
*G06F 16/2457* (2019.01)
*G06N 5/04* (2006.01)

(52) U.S. Cl.
CPC ....... *G06N 5/022* (2013.01); *G06F 16/24573* (2019.01); *G06N 5/048* (2013.01); *G06Q 10/06* (2013.01)

(58) Field of Classification Search
CPC ..................................................... G06N 5/022
USPC ........................................................ 706/52
See application file for complete search history.

(56) References Cited

U.S. PATENT DOCUMENTS

| | | | | |
|---|---|---|---|---|
| 6,353,817 | B1* | 3/2002 | Jacobs | G16H 50/20 706/50 |
| 9,619,586 | B2* | 4/2017 | Bhaskara | G06F 30/00 |
| 10,275,710 | B1* | 4/2019 | Teredesai | G06Q 10/10 |
| 10,754,328 | B2* | 8/2020 | Mullan | G06F 8/60 |
| 11,100,179 | B1* | 8/2021 | Zhou | G06N 5/027 |
| 2010/0207762 | A1* | 8/2010 | Lee | G06V 20/52 340/541 |
| 2013/0018838 | A1* | 1/2013 | Parnaby | G06Q 30/0203 709/204 |
| 2013/0151443 | A1* | 6/2013 | Kyaw | G06N 5/022 706/12 |
| 2014/0304293 | A1* | 10/2014 | Richey, Jr. | G06F 16/27 707/769 |
| 2018/0089316 | A1* | 3/2018 | Ganot | G06F 16/289 |

(Continued)

OTHER PUBLICATIONS

Marklogic, "Object-Based Intelligence" avaiable at <https://www.marklogic.com/wp-content/uploads/2014/12/Object-Based-Production-Intelligence-in-Context-Print.pdf>, published on Dec. 2014. (Year: 2014).*

(Continued)

*Primary Examiner* — Reza Nabi
(74) *Attorney, Agent, or Firm* — Maine Cernota & Rardin (57) ABSTRACT

Techniques, systems, architectures, and methods for efficient and accurate intelligence gathering comprising the combination of Knowledge Modeling (KM) and Object Based Production (OBP) techniques, in embodiments, leveraging a context data layer within Knowledge Models (KMs) to store connections between models and OBP objects that are representative of any entities, organizations, resources, locations, etc. described within a model.

8 Claims, 5 Drawing Sheets

(56) References Cited

U.S. PATENT DOCUMENTS

| | | | |
|---|---|---|---|
| 2018/0096372 A1* | 4/2018 | Rickard, Jr. | G06N 5/003 |
| 2018/0101924 A1* | 4/2018 | Yamaguchi | G06N 20/00 |
| 2019/0197112 A1* | 6/2019 | Kaplan | G06F 40/30 |
| 2019/0303982 A1* | 10/2019 | Michel | G05D 1/0094 |
| 2019/0361854 A1* | 11/2019 | Rogynskyy | G06F 16/288 |
| 2020/0012917 A1* | 1/2020 | Pham | G06F 17/16 |
| 2020/0111013 A1* | 4/2020 | Lee | H04L 67/10 |
| 2020/0175181 A1* | 6/2020 | Hughes | G06F 16/212 |
| 2021/0027175 A1* | 1/2021 | Jenson | G06N 5/022 |
| 2021/0027176 A1* | 1/2021 | Jenson | G06N 5/048 |
| 2021/0264804 A1* | 8/2021 | Venkatasubramanyam | G10L 13/00 |
| 2021/0383270 A1* | 12/2021 | Moro, Jr. | G08G 5/0013 |
| 2022/0019204 A1* | 1/2022 | Maury | G06Q 10/0631 |

OTHER PUBLICATIONS

Cathy Johson, "Modernizing Defence Intelligence: Object based production and activity based intelligence", availale online at <https://info.publicintelligence.net/DIA-ActivityBasedIntelligence.pdf>, published on Jun. 27, 2013 (Year: 2013).*

Aguilar, J., Jerez, M., & Rodriguez, T. (2017). CAMeOnto: Context awareness meta ontology modeling. Applied Computing and Informatics.

Dey, A. K. (2001). Understanding and Using Context. Human-Computer Interaction Institute, 10.

Ejigu, D., Scuturici, M., & Brunie, L. (2007). An ontology-based approach to context modeling and reasoning in pervasive computing. Villeurbanne cedex: Laboratoire LIRIS-UMR-CNRS.

Merriam-Webster definition of the word "Context".

Office Action Restriction for U.S. Appl. No. 16/523,144 dated Mar. 23, 2022, 7 pages.

* cited by examiner

CONNECTING OBP OBJECTS WITH KNOWLEDGE MODELS THROUGH CONTEXT DATA LAYER

FIELD OF THE DISCLOSURE

The following disclosure relates generally to intelligence gathering and, more specifically, to systems and methods of Object Based Production (OBP) and Knowledge Modeling (KM).

BACKGROUND

We live in a world of ever-increasing data. Sensors, satellites, cameras, radar installations, location aware devices, social media, and other devices and systems all contribute to the vast amount of data containing potentially useful intelligence information that is created every day. To help put the sheer volume of this data into perspective, as of 2012, more than 90 percent of the stored data in the world had been created in the previous 2 years. While the huge amount of data available to the Intelligence Community (IC) might be seen as a boon to them, providing granular information about people, places, things and activities, its sheer quantity makes it difficult to work with in a timely manner, which is critical to ensuring that actionable intelligence is in fact acted on before the time for doing so has passed.

The IC relies primarily upon analysts to turn information, i.e. data, into actionable intelligence. Historically, the IC organized and disseminated information and intelligence based on the organization that produced it. Retrieving all available information about a person, place, or thing was primarily performed by going to the individual repository of each data producer and required an understanding of the sometimes unique naming conventions used by the different data producers to retrieve that organization's information or intelligence about the same person, place, or thing. Consequently, analysts could conceivably omit or miss important information or erroneously assume gaps existed where they did not.

Given the vast amount of data that must be sifted through, analysts using these historical systems and methods face an uphill battle against the challenges of the Four V's, i.e. Variety, Volume, Velocity, and Veracity. The current model of individual analysts working alone to sift through stockpiles of data within stove-piped systems, systems that have the potential to share data or functionality with other systems but which do not do so, is no longer efficient or even sufficient. As the amount of data is only expected to increase over time and the present intelligence budget is widely considered unsustainable, given current fiscal pressures, and yet inadequate considering the scope and scale of current and future operational requirements, the way in which analysts transform that data into intelligence must change to keep up while dealing with fiscal realities.

What is needed, therefore, are systems and methods that allow the IC to transform vast quantities of raw data into actionable intelligence in a timely and cost-effective manner.

SUMMARY

An object-based paradigm can assist the IC in keeping up with the vast amount of potentially actionable intelligence data generated each and every day while dealing with budgetary constraints. Object Based Production (OBP), as part of an object-based paradigm, creates a conceptual object for people, places, and things that becomes a single point of convergence for all information and intelligence produced about that object.

Said another way, OBP creates a conceptual object for people, places, and things and then uses that object as a bucket or container in which to store all information and intelligence produced about those people, places, and things. The object becomes the single point of convergence for all information and intelligence produced about a topic of interest to intelligence professionals. By extension, the objects also become launching points to discover information and intelligence.

Knowledge Modeling (KM), a technical solution that allows for the elicitation and documentation of multi-faceted knowledge about activities and behaviors, can be combined with OBP to help analysts overcome data overload and collapse the current silos of information that plague the tradecraft today.

More specifically, while OBP and KM are useful on their own, there is no currently existing solution that automatically connects Knowledge Models with the OBP objects that represent what is being documented in the models. As new data is generated, models have no way to automatically leverage that new data.

Embodiments of the present disclosure described herein automatically leverage new data as it is introduced by connecting Knowledge Models (KMs) with the OBP objects that represent what is being documented in the models.

Implementations of the techniques discussed above may include a method or process, a system or apparatus, a kit, or computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described.

The accompanying drawings are not intended to be drawn to scale. For purposes of clarity, not every component may be labeled in every drawing.

DETAILED DESCRIPTION

Object-Based Production (OBP) increases information integration across the Intelligence Community (IC) by creating a common landing zone for data that crosses organizational and functional boundaries. Furthermore, this model introduces analytic efficiency; reducing the amount of time analysts spend organizing, structuring, and discovering information and intelligence. By extension, OBP allows analysts more time for higher order analysis while reducing how long it takes to understand how new data relate to existing knowledge. Essentially, by organizing information, its usefulness increases.

Combined with Knowledge Modeling (KM), significant gains in analyst efficiency can be realized. More specifically, linking Knowledge Models (KMs) to OBP Data 100 enables automatic discovery of new information. It also enables recommendations of additional relevant information and relationships to be made to the analyst. While this could be accomplished manually, it would be time intensive to do so and would often result in the window for acting on actionable data passing before the significance of that data was realized.

For example, if done manually, once an analyst has created a model, they would have to work together with a developer to establish unique, one-off, complex queries to identify data potentially relevant to their model and to connect a model to a Data Source 104. The present disclosure provides solutions that allow the automation of that process by allowing the user to discover and connect these OBP Objects 500 from within a KM Workspace 200.

For instance, if there is an existing model concerning a particular organization's processes or behaviors and if there are existing Data Repositories 104 that contain OBP Data 100 about that organization, using the systems and methods disclosed herein, analysts are able to store a connection within the existing model to the OBP Data 100 so that, as new OBP Data 100 enters the system, the model is able to gather that new information as potential evidence for model events.

Figure 5:
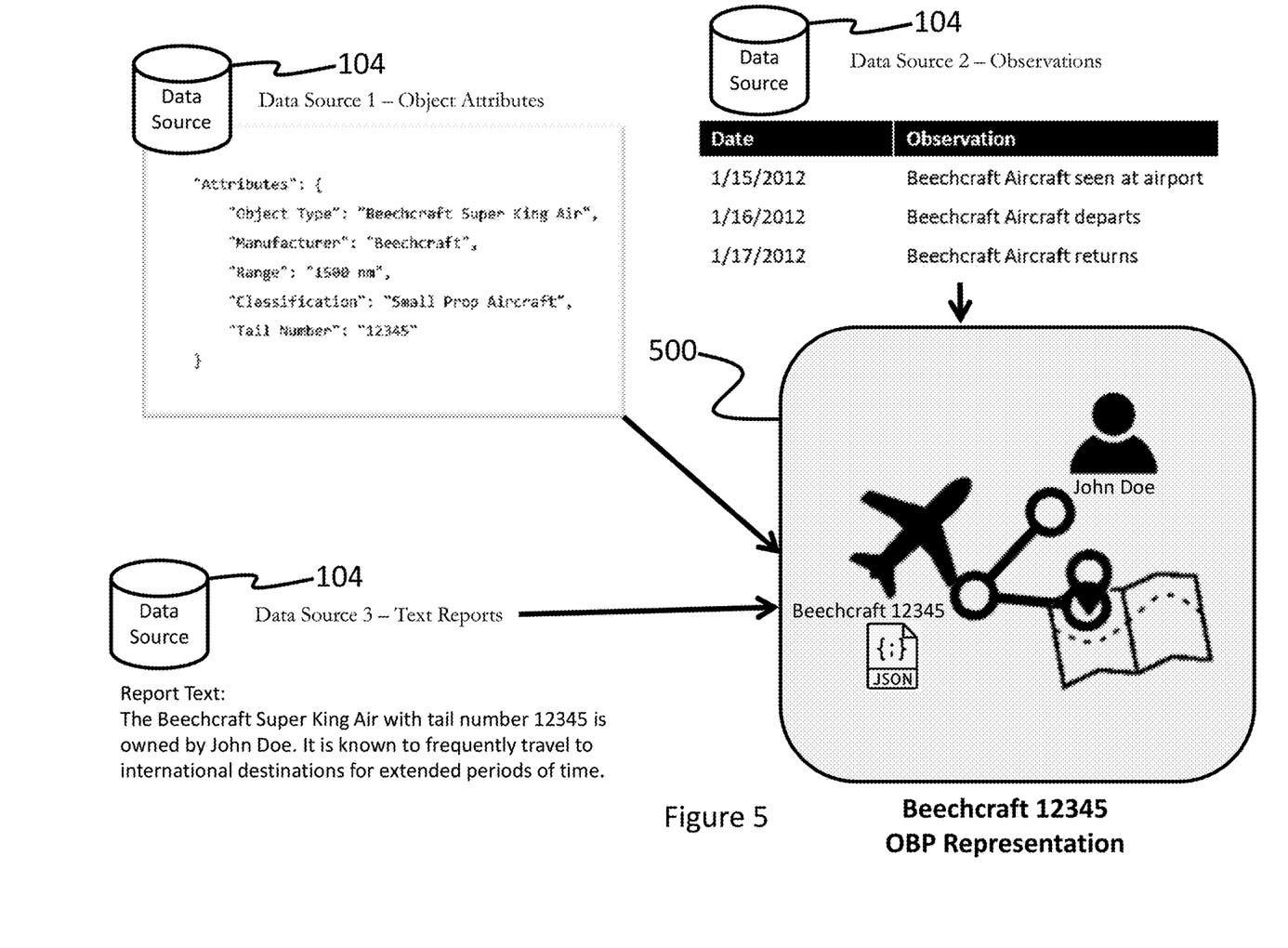
FIG. 5 is a schematic showing data from data sources being combined to form an object based production representation of the data, in accordance with embodiments of the present disclosure.

As a specific example, we will assume that an IC analyst or analysts are using a KM Workspace 200 for knowledge capture and may use the KM Workspace 200 to create a flowchart describing the actions of an individual or organization and how they affect or otherwise interact with other individuals, organizations of interest, locations, things, etc. Let us then further assume that the knowledge capture is related to the activities of a specific aircraft. In this case, OBP Data/Objects 100/500, such as the OBP Object 500 shown in FIG. 5, which represents a combination of object attributes, observations, and text reports from different Data Sources 104, that represent various types of information about the aircraft, but that, in embodiments, might represent various types of information about activities, people, businesses, and other relevant information, may be brought in to a modeling environment, such as a KM Workspace 200. These OBP Data Objects 500 may then be connected to models being created. In embodiments, models store links to the data's original location.

Furthermore, in many cases the data pulled from disparate Data Sources 104 (e.g. reports, human observations, SIGINT, etc.) may use different terminology, symbology, syntax, and the like. In embodiments, Linked Data Façades (LDFs) 102 are used to enable communication with these disparate Data Sources 104 by obtaining and formatting the data into a more standardized form that can be used in a KM Workspace 200. By using LDFs 102, the IC analyst avoids having to "speak the language" of each data type, minimizing the potential for missing potentially-actionable data. These LDFs 102, in embodiments, also provide bidirectional update capabilities for data.

In embodiments, analysts are allowed to query for OBP Data 100, find evidence relative to their models, and receive recommendations related to the content they are discovering. In embodiments, this includes leveraging a context data layer, e.g. metadata fields configured for storing contextual information, within Knowledge Models (KMs) to store connections between models and OBP Objects 500 that are representative of any entities, organizations, resources, locations, etc. described within a model.

In embodiments, data is classified according to what type of context (e.g. who, what, where, when, etc.) it provides.

Figure 1:
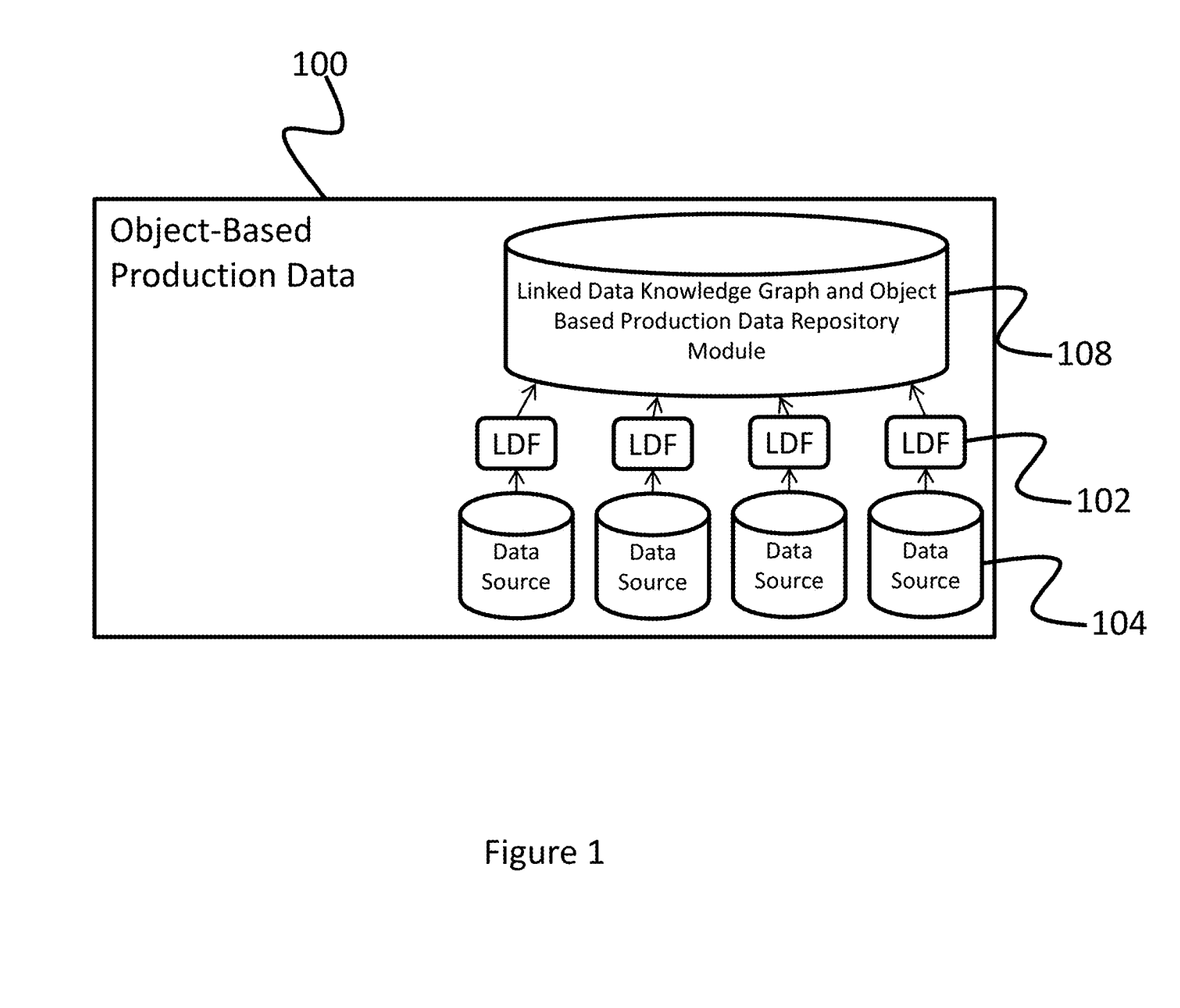
FIG. 1 is schematic showing an Object Based Production (OBP) workspace, in accordance with embodiments of the present disclosure.

FIG. 1 schematically describes an OBP Data 100 system comprising a Linked Data Knowledge Graph (LDKG) and Object Based Production (OBP) Data Repository Module 108 that is in communication with a plurality of Data Sources 104 through Linked Data Façades (LDFs) 102.

Regarding the LDKG and OBP Data Repository Module 108, in this context, it should be understood to refer to a module that, using linked data, i.e. data that can be connected together and interpreted by machines, acquires and integrates information into an ontology and applies a reasoner to derive new knowledge (i.e. by creating knowledge graphs). Since a knowledge graph is organized as a graph, new data items can be connected to existing data items as the new data is injected into the data pool. Links may also be easily traversed, allowing users to discover how remote data items relate to each other.

In embodiments, the LDKG and OBP Data Repository Module 108, using data from Data Sources 104, is configured to implement tradecraft programmatically. For example, with geospatial intelligence (GEOINT), earth observation involves seeking changes, with each change representing an observation, and with each observation representing an artificial or natural object. By structuring observations in this deliberate way, information can be teased out of the data that might not otherwise be apparent.

The underlying basis of a knowledge graph is the ontology, which specifies the semantics of the data. An ontology may be based on logical formalisms that support some form of inference, allowing implicit information to be derived from explicitly asserted data.

Knowledge graphs being actual graphs, in the proper mathematical sense, allow for the application of various graph-computing techniques and algorithms (for example, shortest path computations, or network analysis), which add additional intelligence over the stored data.

Figure 2:
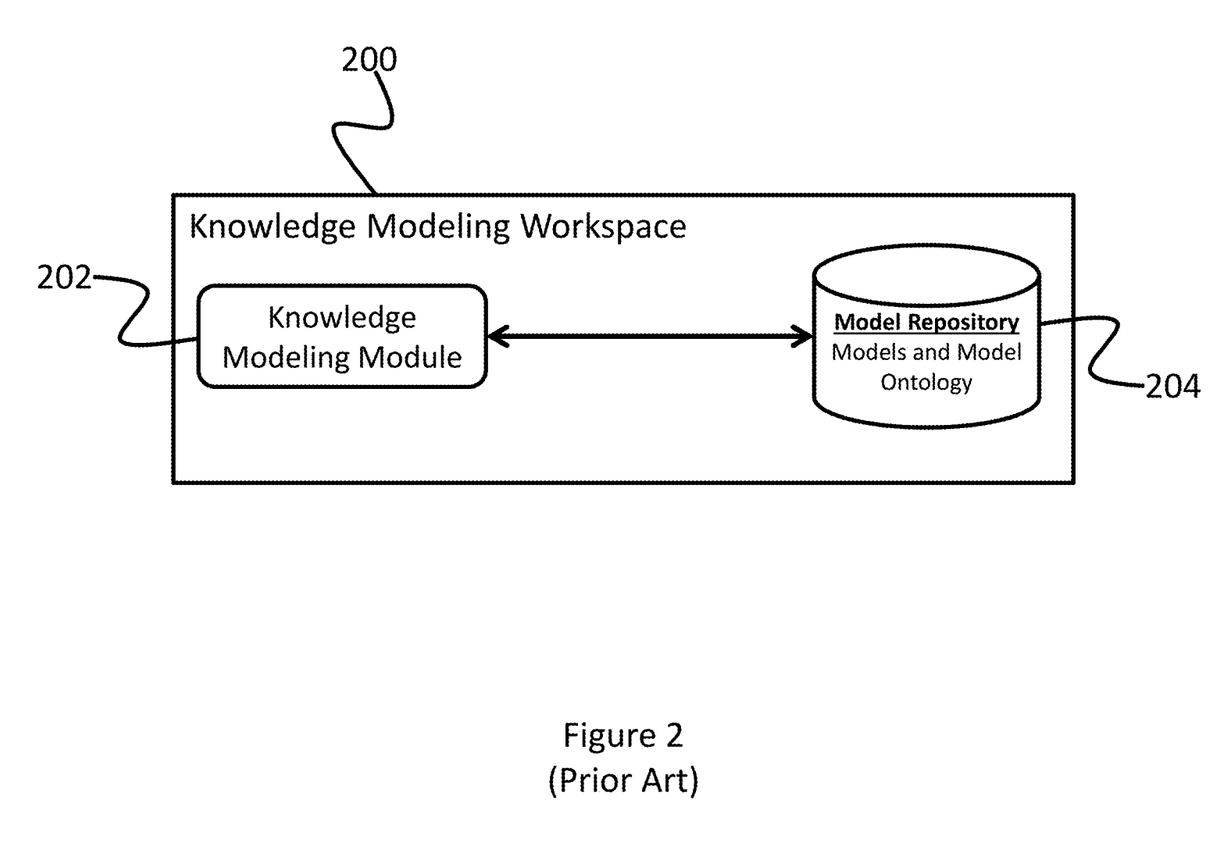
FIG. 2 is schematic showing an Knowledge Modeling (KM) workspace, as known in the prior art.

FIG. 2 schematically describes a KM Workspace 200. The KM Workspace 200 contains a Knowledge Modeling Module (KMM) 202, in communication with a model repository 204. In embodiments, the KMM 202 represents a User Interface (UI) and Application Programming Interface (API) used to create core model elements, including components (a discrete element of a model which can be either hierarchical or sequential), constraints (a spatial, temporal, meteorological or other limitation that influences the behavior that is being described), and indicators (an item of information that can be used to evaluate a component). The Model Repository 204 should be considered a storage area in which metadata of a data model is stored.

Figure 3:
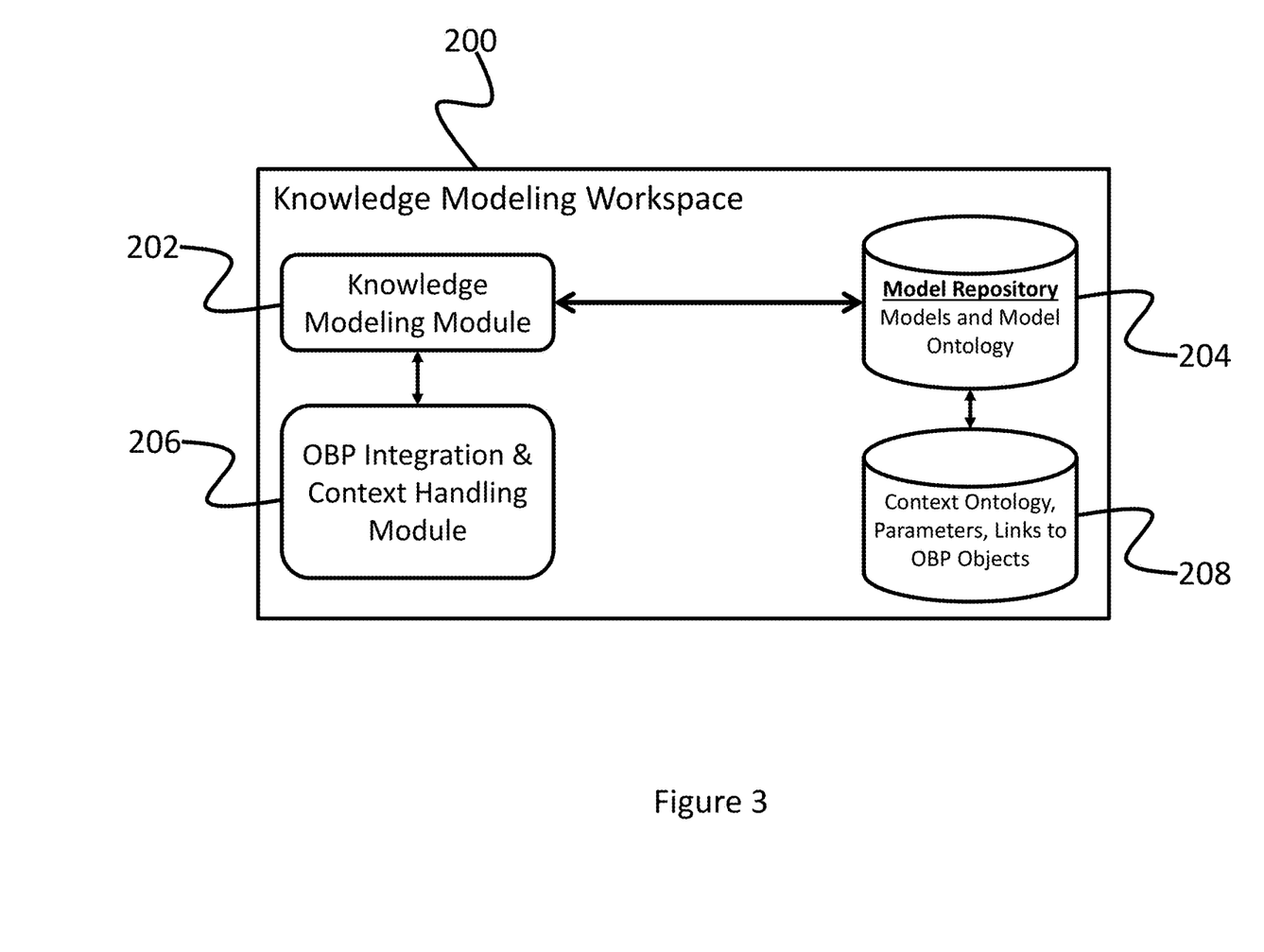
FIG. 3 is schematic showing an Knowledge Modeling (KM) workspace, in accordance with embodiments of the present disclosure.

FIG. 3 schematically describes a KM Workspace 200 that, in addition to the elements described above in connection with FIG. 2, further includes a Context Ontology, Parameters, and Links to OBP Objects Module 208 in bidirectional communication with the Model Repository 204 and OBP Integration & Context Handling Module 206 in bidirectional communication with the KMM 202, wherein the OBP Integration & Context Handling Module 206 is configured to update data and/or notify a user of update(s) to data as they are made in Data Sources 104. In embodiments, the OBP Integration & Context Handling Module 206 is also configured to update the data in the data sources 104 themselves based on updates made in the Knowledge Modeling workspace 200.

Figure 4:
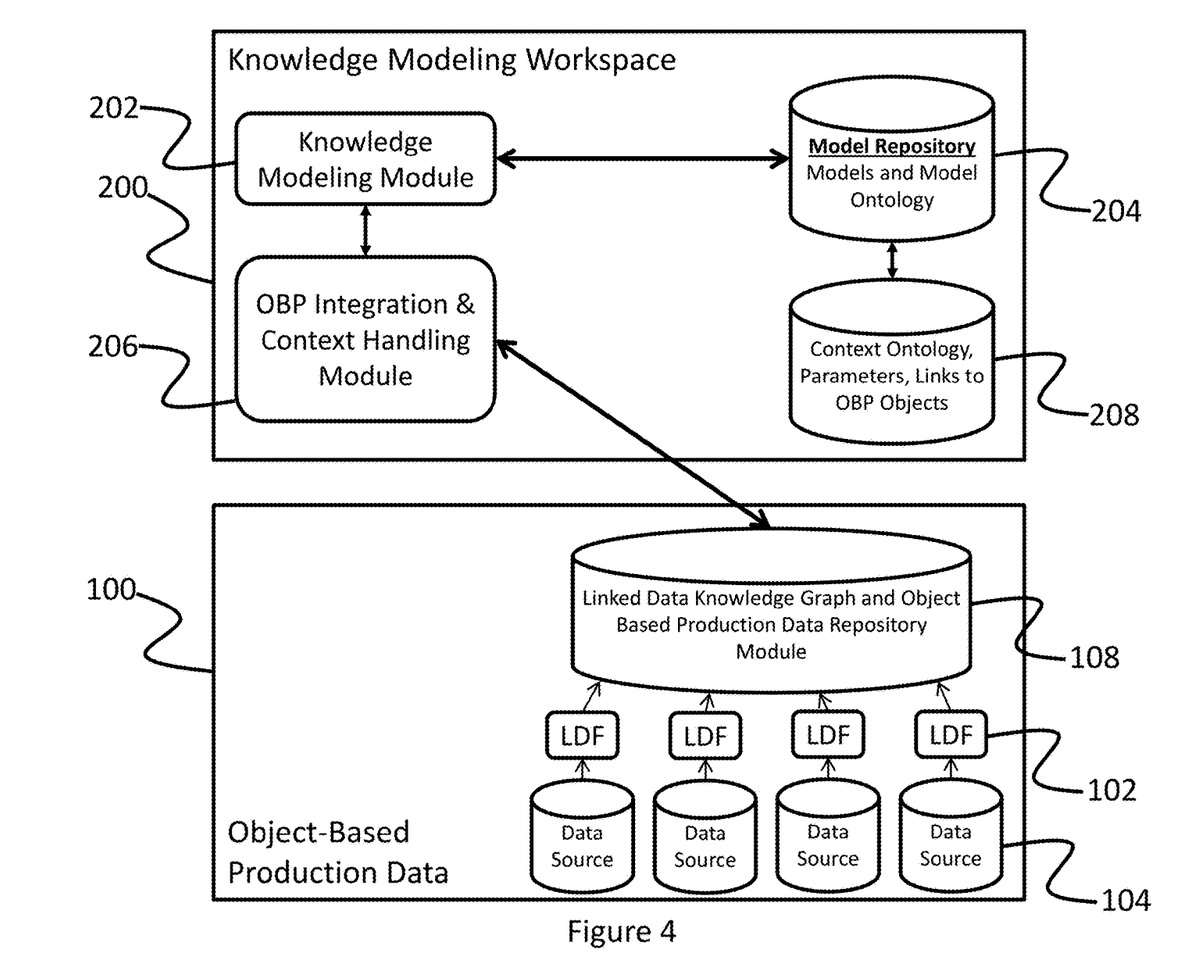
FIG. 4 is schematic showing the combination of an Object Based Production (OBP) workspace and a Knowledge Modeling (KM) workspace, in accordance with embodiments of the present disclosure.

FIG. 4 schematically describes the OBP Workspace 100 of FIG. 1 combined with the KM Workspace 200 of FIG. 3, in accordance with embodiments of the present disclosure. Notably, the OBP workspace 100 is configured to communicate with the KM Workspace 200 via the LDKG and OBP Data Repository Module 108, which is in communication with the KM Workspace 200 via the OBP Integration & Context Handling Module 206.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A knowledge modeling system, the system comprising:
a processor;
a plurality of data sources containing object-based production data;
a knowledge modeling workspace configured to interface with each of the plurality of data sources and make object-based production data contained therein available to a user of said knowledge modeling workspace for manipulation within said knowledge modeling workspace;
at least one linked data facade;
a linked data knowledge graph and object based production data repository module configured to acquire and integrate information into an ontology, apply a reasoner to derive new knowledge,
output that new knowledge in the form of a knowledge graph, and implement tradecraft programmatically;
a knowledge modeling module; and
a model repository,
wherein said knowledge modeling workspace is further configured to organize said object-based production data by the context that it provides,
wherein each linked data facade is configured to obtain and format object-based production data contained in one or more of the plurality of data sources into a standardized form for use in the knowledge modeling workspace,
wherein the linked data knowledge graph and object based production data repository module is in bidirectional communication with the knowledge modeling workspace,
wherein the linked data knowledge graph and object based production data repository module is configured to connect new object based production data to existing object based production data as new object based production data is added to the plurality of data sources,
wherein object based production data, as presented to a user in the knowledge modeling workspace, further comprises links to related object based production data,
wherein the knowledge modeling module is configured to programmatically produce a knowledge map that captures and exposes knowledge about what is known and what is thought about behaviors, processes, organizations, and activities, and
wherein the model repository comprises a storage area in which metadata relating to object based production.

2. The knowledge modeling system of claim 1 further comprising an object based production integration and context handling module, wherein the object based production integration and context handling module is configured to notify a user of the availability of updated object based production data used in the knowledge modeling workspace based on changes made to that same data in the data source from which the object based production data originated.

3. The knowledge modeling system of claim 2 wherein the determination of whether or not data is similar enough to generate a notification to the user is made programmatically, based on the presence of shared metadata.

4. The knowledge modeling system of claim 1 further comprising a service updates for object-based production integration and context handling module, wherein the service updates for object-based production integration and context handling module is configured to update object based production data used in the knowledge modeling workspace based on changes made to that same data in the data source from which the object based production data originated.

5. The knowledge modeling system of claim 1 wherein said object-based production data that is organized by the context it provides is organized into context categories comprising who, what, when, how, and where.

6. The knowledge modeling system of claim 1, further comprising an object based production integration and context handling module, wherein the object based production integration and context handling module is configured to update object based production data used in the knowledge modeling workspace based on changes made to that same data in the data source from which the object based production data originated.

7. The knowledge modeling system of claim 1 further comprising an object based production integration and context handling module, wherein the object based production integration and context handling module is configured to notify a user of the availability of related object based production data in any of the plurality of data sources used in the knowledge modeling workspace.

8. The knowledge modeling system of claim 1 further comprising an object based production integration and context handling module, wherein the object based production integration and context handling module is configured to push updated object based production data used in the knowledge modeling workspace back to the data source from which the object based production data originated.

* * * * *